(12) United States Patent
Ichiki et al.

(10) Patent No.: US 10,479,005 B2
(45) Date of Patent: Nov. 19, 2019

(54) COMPOSITE MOLDED ARTICLE AND METHOD FOR PRODUCING THE SAME

(71) Applicant: Asahi Kasei Kabushiki Kaisha, Tokyo (JP)

(72) Inventors: Hideaki Ichiki, Tokyo (JP); Taiga Saito, Tokyo (JP); Yuo Umei, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/771,425

(22) PCT Filed: Oct. 27, 2016

(86) PCT No.: PCT/JP2016/081962
§ 371 (c)(1),
(2) Date: Apr. 27, 2018

(87) PCT Pub. No.: WO2017/073696
PCT Pub. Date: May 4, 2017

(65) Prior Publication Data
US 2018/0326627 A1    Nov. 15, 2018

(30) Foreign Application Priority Data

Oct. 29, 2015  (JP) .................................. 2015-213407
Oct. 29, 2015  (JP) .................................. 2015-213408

(51) Int. Cl.
*B29C 45/00*       (2006.01)
*B32B 5/08*        (2006.01)
(Continued)

(52) U.S. Cl.
CPC .......... *B29C 45/0005* (2013.01); *B29C 43/18* (2013.01); *B29C 45/14221* (2013.01);
(Continued)

(58) Field of Classification Search
CPC .................................................. B29C 45/0005
(Continued)

(56) References Cited

U.S. PATENT DOCUMENTS 3,834,979 A  *  9/1974  Rossell .................. A41D 27/06
                                                  442/394
4,249,517 A      2/1981  Schroeder et al.
(Continued)

FOREIGN PATENT DOCUMENTS

JP          60033520 A  *  2/1985  .......... G02B 6/4402
JP       H05-253959 A      10/1993
(Continued)

OTHER PUBLICATIONS

Wadahara, E.; Composite Molding and Method of Manufacturing the Same; Jan. 10, 2013; JPO; whole document (Year: 2013).*
(Continued)

*Primary Examiner* — Tahseen Khan
(74) *Attorney, Agent, or Firm* — Morgan, Lewis & Bockius LLP

(57) ABSTRACT

A composite molded article (3) containing: a thermoplastic resin continuous fiber composite material (1) containing a continuous reinforcement fiber (A) and a thermoplastic resin (B); and a thermoplastic resin composition (2), wherein the thermoplastic resin continuous fiber composite material (1) is bonded to the thermoplastic resin composition (2) via a bonding surface, and
a bonded part between the thermoplastic resin continuous fiber composite material (1) and the thermoplastic resin composition (2) has a tensile strength which is 0.35 times or more as strong as a tensile strength of the thermoplastic resin composition (2).

18 Claims, 5 Drawing Sheets

(51) Int. Cl.

| | |
|---|---|
| B29C 43/18 | (2006.01) |
| B32B 27/12 | (2006.01) |
| B29C 45/14 | (2006.01) |
| B32B 5/10 | (2006.01) |
| B32B 27/34 | (2006.01) |
| B32B 5/02 | (2006.01) |
| B32B 5/26 | (2006.01) |
| B32B 27/28 | (2006.01) |
| B32B 27/32 | (2006.01) |
| B32B 27/36 | (2006.01) |
| B32B 27/42 | (2006.01) |
| B29K 105/08 | (2006.01) |
| B29K 77/00 | (2006.01) |
| B29K 105/12 | (2006.01) |
| B29K 309/08 | (2006.01) |

(52) U.S. Cl.
CPC ........ *B29C 45/14786* (2013.01); *B32B 5/022* (2013.01); *B32B 5/024* (2013.01); *B32B 5/026* (2013.01); *B32B 5/08* (2013.01); *B32B 5/10* (2013.01); *B32B 5/26* (2013.01); *B32B 27/12* (2013.01); *B32B 27/281* (2013.01); *B32B 27/286* (2013.01); *B32B 27/288* (2013.01); *B32B 27/32* (2013.01); *B32B 27/322* (2013.01); *B32B 27/34* (2013.01); *B32B 27/36* (2013.01); *B32B 27/365* (2013.01); *B32B 27/42* (2013.01); B29K 2077/00 (2013.01); B29K 2105/08 (2013.01); B29K 2105/0881 (2013.01); B29K 2105/12 (2013.01); B29K 2309/08 (2013.01); B29K 2995/0077 (2013.01); B32B 2250/20 (2013.01); B32B 2255/02 (2013.01); B32B 2255/26 (2013.01); B32B 2260/021 (2013.01); B32B 2260/023 (2013.01); B32B 2260/046 (2013.01); B32B 2262/02 (2013.01); B32B 2262/0253 (2013.01); B32B 2262/0261 (2013.01); B32B 2262/0269 (2013.01); B32B 2262/0276 (2013.01); B32B 2262/101 (2013.01); B32B 2262/103 (2013.01); B32B 2262/105 (2013.01); B32B 2262/106 (2013.01); B32B 2262/14 (2013.01); B32B 2307/54 (2013.01); B32B 2307/732 (2013.01); B32B 2605/00 (2013.01)

(58) Field of Classification Search
USPC .......................................................... 428/220
See application file for complete search history.

(56) References Cited

U.S. PATENT DOCUMENTS

| | | | |
|---|---|---|---|
| 5,028,478 A * | 7/1991 | Odagiri | C08J 5/24 |
| | | | 428/327 |
| 5,288,829 A * | 2/1994 | Takago | C08L 83/12 |
| | | | 528/15 |
| 5,356,588 A | 10/1994 | Hara et al. | |
| 2008/0166511 A1 * | 7/2008 | Honma | C08G 59/50 |
| | | | 428/36.4 |
| 2009/0208721 A1 * | 8/2009 | Tsuchiya | B29C 45/14786 |
| | | | 428/220 |
| 2011/0254193 A1 * | 10/2011 | Shui-Yuan | B29C 45/14786 |
| | | | 264/152 |
| 2013/0001817 A1 * | 1/2013 | Bessho | B29C 44/1209 |
| | | | 264/45.3 |
| 2013/0344282 A1 | 12/2013 | Yagi et al. | |
| 2015/0283739 A1 | 10/2015 | Bauersachs et al. | |
| 2016/0296720 A1 * | 10/2016 | Henry | A61M 16/0666 |
| 2016/0361902 A1 * | 12/2016 | Ibayashi | B29C 55/28 |

FOREIGN PATENT DOCUMENTS

| | | | |
|---|---|---|---|
| JP | 2000-280281 A | | 10/2000 |
| JP | 2002309007 A | * | 10/2002 |
| JP | 2009-113244 A | | 5/2009 |
| JP | 2010-131804 A | | 6/2010 |
| JP | 2011-218559 A | | 11/2011 |
| JP | 2011218559 A | * | 11/2011 |
| JP | 2012-206446 A | | 10/2012 |
| JP | 2013-006389 A | | 1/2013 |
| JP | 2013006389 A | * | 1/2013 |
| JP | 2014-136365 A | | 7/2014 |
| JP | 2014-172201 A | | 9/2014 |
| JP | 2015-101794 A | | 6/2015 |
| TW | 509617 B | | 11/2002 |
| WO | 2012/117593 A | | 9/2012 |
| WO | 2014/076109 A1 | | 5/2014 |

OTHER PUBLICATIONS

Yabutani, S.; Composite Member and Method of Manufacturing the Same; Nov. 4, 2011; JPO; whole document (Year: 2011).*

Tsukada, H.; Fiber-Reinforced Thermoplastic Resin Molded Product and Method for Producing the Same; Oct. 23, 2002; JPO; whole document (Year: 2002).*

Nakasone, T.; Fiber-Reinforced Optical Fiber and its Manufacture; Feb. 20, 1985; JPO; whole document (Year: 1985).*

International Search Report issued in corresponding International Patent Application No. PCT/JP2016/081962 dated Jan. 31, 2017.

International Preliminary Report on Patentability and Written Opinion issued in corresponding International Patent Application No. PCT/JP2016/081962 dated May 1, 2018.

Supplementary European Search Report issued in corresponding European Patent Application No. 168599256 dated Jul. 19, 2018.

* cited by examiner

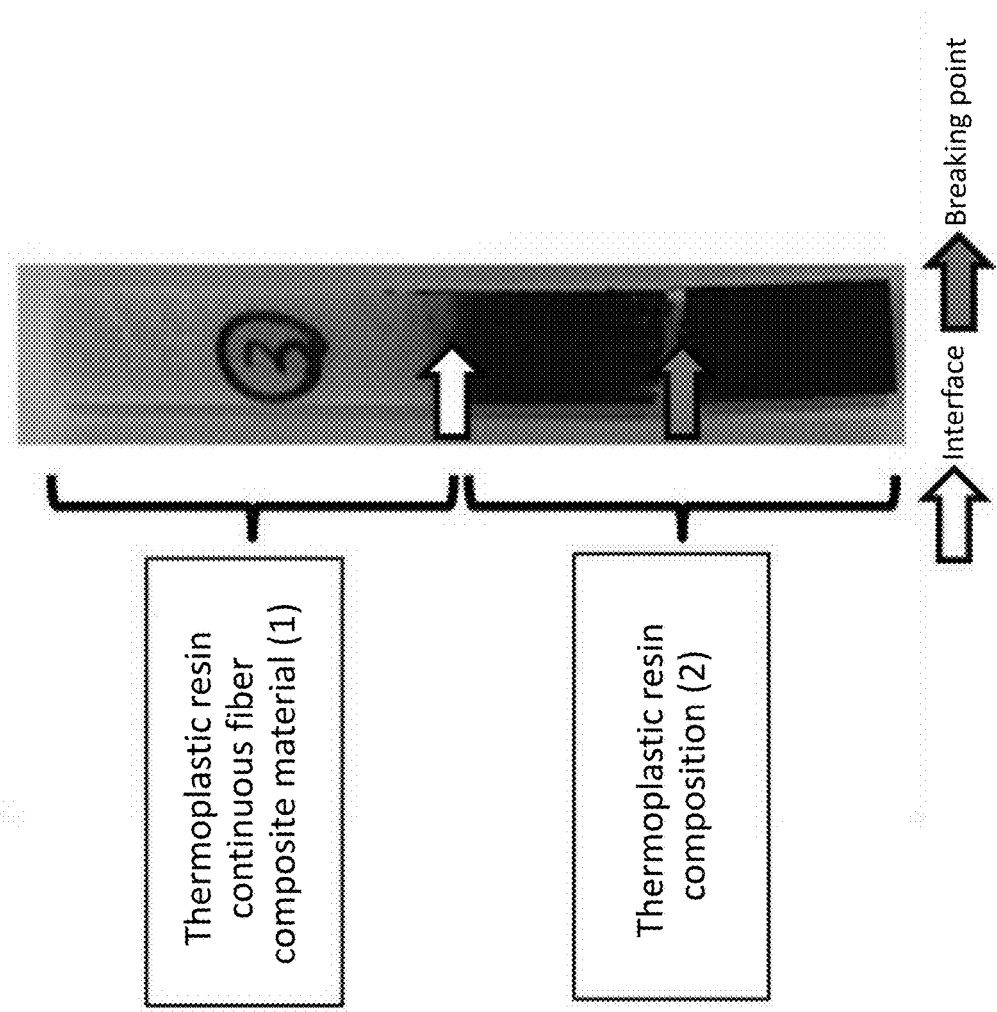

COMPOSITE MOLDED ARTICLE AND METHOD FOR PRODUCING THE SAME

TECHNICAL FIELD

The present invention relates to a composite molded article and a method for producing the composite molded article.

BACKGROUND ART

A molded article of a composite material, which is produced by adding reinforcement materials such as a glass fiber to a resin material, is used in structural parts of various machines and automobiles, pressure containers and tubular structural objects.

As a material constituting the molded article of a composite material, a composite yarn in which a continuous reinforcement fiber and a continuous thermoplastic resin fiber are continuously and uniformly mixed and a fabric comprising the composite yarn have been proposed.

Further, a molded article obtained by heating the fabric to about 280° C. to allow the thermoplastic resin portion to melt, and then cooling it to about 50° C. to solidify it, has also been proposed (for example, see Patent Literature 1).

Recently, as a hybrid molding method for forming a structural member having a complicated shape, a method of inserting a metal member and a composite material into a mold of an injection molding machine, and then injecting a molten thermoplastic resin composition into the mold to obtain a composite molded article, has been proposed.

CITATION LIST

Patent Literature

Patent Literature 1: Japanese Patent Laid-Open No. 2015-101794

SUMMARY OF INVENTION

Technical Problem

However, in the above composite molded articles known in the prior arts, the bond strength of the interface between a metal member or a composite material, which is previously placed in a mold, and a thermoplastic resin composition injected into the mold is not sufficient. There is still room for improvement.

Patent Literature 1 does not disclose any composite molded article produced by the hybrid molding method and having excellent bond strength.

Then, an object of the present invention is to provide a composite molded article comprising a thermoplastic resin continuous fiber composite material and a thermoplastic resin composition and having excellent bond strength.

Solution to Problem

The present inventors conducted intensive studies in order to solve the above problems presented in the prior art. As a result, they found that a composite molded article comprising a thermoplastic resin continuous fiber composite material and a thermoplastic resin composition and having excellent bond strength can be produced by a particular hybrid molding method. Based on the finding, the present invention was accomplished.

More specifically, the present invention is as follows.

[1] A composite molded article (3) comprising: a thermoplastic resin continuous fiber composite material (1) comprising a continuous reinforcement fiber (A) and a thermoplastic resin (B); and a thermoplastic resin composition (2), wherein the thermoplastic resin continuous fiber composite material (1) is bonded to the thermoplastic resin composition (2) via a bonding surface, and a bonded part between the thermoplastic resin continuous fiber composite material (1) and the thermoplastic resin composition (2) has a tensile strength which is 0.35 times or more as strong as a tensile strength of the thermoplastic resin composition (2).

[2] The composite molded article according to the above [1], wherein the bonded part between the thermoplastic resin continuous fiber composite material (1) and the thermoplastic resin composition (2) has a tensile strength which is 0.5 times or more as strong as the tensile strength of the thermoplastic resin composition (2).

[3] The composite molded article according to the above [1] or [2], wherein the bonded part between the thermoplastic resin continuous fiber composite material (1) and the thermoplastic resin composition (2) has a tensile strength which is 1.0 time or more as strong as the tensile strength of the thermoplastic resin composition (2).

[4] The composite molded article according to any of the above [1] to [3], wherein the thermoplastic resin composition (2) comprises a non-continuous reinforcement material.

[5] The composite molded article according to any of the above [1] to [4], wherein the bonded part between the thermoplastic resin continuous fiber composite material (1) and the thermoplastic resin composition (2) has a convexo-concave structure where the material (1) and the composition (2) are mixed with each other.

[6] The composite molded article according to the above [5], wherein a length L of an interface at the bonding surface between the thermoplastic resin continuous fiber composite material (1) and the thermoplastic resin composition (2); and a thickness t of the composite molded article (3) satisfy a relation of L>1.8t.

[7] The composite molded article according to the above [5] or [6], wherein the length L and the thickness t satisfy a relation of L>2.0t.

[8] The composite molded article according to the above [6] or [7], wherein the interface is formed by the continuous reinforcement fiber (A) comprised in the thermoplastic resin continuous fiber composite material (1) and the non-continuous reinforcement material comprised in the thermoplastic resin composition (2).

[9] A composite molded article (3) comprising: a thermoplastic resin continuous fiber composite material (1) comprising a continuous reinforcement fiber (A) and a thermoplastic resin (B); and a thermoplastic resin composition (2), wherein the thermoplastic resin continuous fiber composite material (1) is bonded to the thermoplastic resin composition (2) via a bonding surface, and a bonded part between the thermoplastic resin continuous fiber composite material (1) and the thermoplastic resin composition (2) has a convexo-concave structure where the material (1) and the composition (2) are mixed with each other.

[10] The composite molded article according to the above [9], wherein a length L of an interface at the bonding surface between the thermoplastic resin continuous fiber composite material (1) and the thermoplastic resin composition (2); and a thickness t of the composite molded article (3) satisfy a relation of L>1.8t.

[11] The composite molded article according to the above [9] or [10], wherein the length L and the thickness t satisfy a relation of L>2.0t.

[12] The composite molded article according to the above [10] or [11], wherein the interface is formed by the continuous reinforcement fiber (A) comprised in the thermoplastic resin continuous fiber composite material (1) and a non-continuous reinforcement material comprised in the thermoplastic resin composition (2).

[13] The composite molded article according to any of the above [1] to [12], wherein the continuous reinforcement fiber (A) is at least one selected from the group consisting of a glass fiber, a carbon fiber, an aramid fiber, a super strong polyethylene fiber, a polybenzazole fiber, a liquid crystal polyester fiber, a polyketone fiber, a metal fiber and a ceramic fiber.

[14] The composite molded article according to any of the above [1] to [13], wherein the thermoplastic resin (B) is at least one selected from the group consisting of a polyolefin resin, a polyamide resin, a polyester resin, a polyether ketone, a polyether ether ketone, a polyether sulfone, a polyphenylene sulfide, a thermoplastic polyetherimide and a thermoplastic fluororesin.

[15] The composite molded article according to any of the above [1] to [14], wherein the thermoplastic resin (B) is a thermoplastic resin fiber.

[16] The composite molded article according to any of the above [1] to [15], wherein the thermoplastic resin continuous fiber composite material (1) as a raw material is a fabric-shaped material.

[17] A method for producing a composite molded article comprising: a thermoplastic resin continuous fiber composite material (1) comprising a continuous reinforcement fiber (A) and a thermoplastic resin (B); and a thermoplastic resin composition (2), wherein the thermoplastic resin continuous fiber composite material (1) is bonded to the thermoplastic resin composition (2) via a bonding surface, comprising:
  a step of shaping the thermoplastic resin continuous fiber composite material (1) in a mold;
  a step of injecting the thermoplastic resin composition (2) into the mold; and
  a step of bonding the thermoplastic resin continuous fiber composite material (1) and the thermoplastic resin composition (2).

[18] The method for producing a composite molded article according to the above [17], further comprising, after the step of injecting the thermoplastic resin composition (2) into the mold,
  a step of compressing and molding the thermoplastic resin continuous fiber composite material (1) and the thermoplastic resin composition (2) in the mold having a temperature equal to or higher than the melting point of the thermoplastic resin (B).

[19] The method for producing a composite molded article according to the above [17] or [18], wherein a temperature of the mold in the step of injecting the thermoplastic resin composition (2) into the mold is equal to or lower than the melting point of the thermoplastic resin (B).

[20] The method for producing a composite molded article according to the above [17], further comprising, after the step of shaping the thermoplastic resin continuous fiber composite material (1) in the mold,
  a step of compressing and molding the thermoplastic resin continuous fiber composite material (1) in the mold having a temperature equal to or higher than the melting point of the thermoplastic resin (B).

[21] The method for producing a composite molded article according to the above [20], wherein, in the step of injecting the thermoplastic resin composition (2) into the mold, the injection is carried out when a temperature of the mold is equal to or higher than the melting point of the thermoplastic resin (B).

[22] The method for producing a composite molded article according to any of the above [17] to [21], wherein a bonded part between the thermoplastic resin continuous fiber composite material (1) and the thermoplastic resin composition (2) has a convexo-concave structure where the material (1) and the composition (2) are mixed with each other.

[23] The method for producing a composite molded article according to any of the above [17] to [22], wherein an injection pressure or an injection-holding pressure applied when the thermoplastic resin composition (2) is injected or held in the mold is equal to a press pressure applied when the thermoplastic resin continuous fiber composite material (1) and the thermoplastic resin composition (2) are compressed and molded.

[24] The method for producing a composite molded article according to any of the above [17] to [23], wherein, after the thermoplastic resin composition (2) is injected into the mold, the injection-holding pressure, which is equal to the press pressure applied when the thermoplastic resin continuous fiber composite material (1) and the thermoplastic resin composition (2) are compressed and molded, is continuously applied until the thermoplastic resin continuous fiber composite material (1) and the thermoplastic resin composition (2) has a temperature which is a solidification temperature $-10°$ C., or less.

Advantageous Effects of Invention

The present invention can provide a composite molded article comprising a thermoplastic resin continuous fiber composite material and a thermoplastic resin composition and having excellent bond strength; and a method for producing the composite molded article.

BRIEF DESCRIPTION OF DRAWINGS

FIG. 5 shows the results of the tensile test of Example 2.

DESCRIPTION OF EMBODIMENTS

Figure 1:
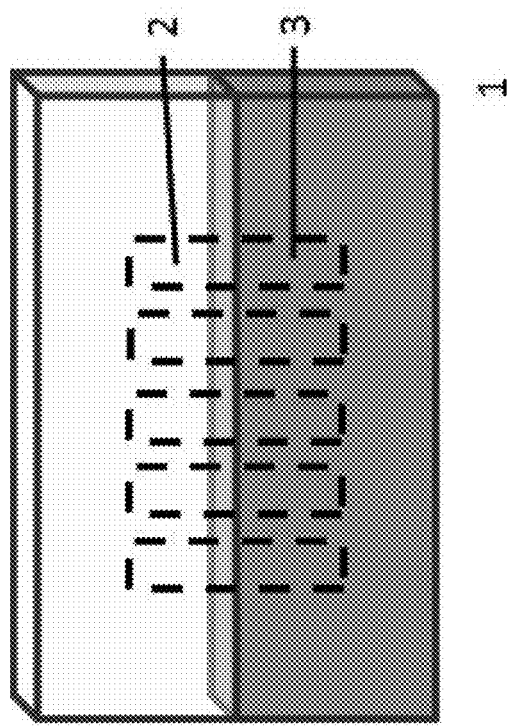
FIG. 1 shows a schematic perspective view of one example of a composite molded article according to the present embodiment.

An embodiment of the present invention (hereinafter referred to as "the present embodiment") will be more specifically described below. The present invention is not limited to the following present embodiment and can be carried out by modifying it in various ways within the scope of the invention.

[Composite Molded Article]

The composite molded article of the present embodiment comprises a composite molded article (3) comprising: a thermoplastic resin continuous fiber composite material (1) comprising a continuous reinforcement fiber (A) and a thermoplastic resin (B); and a thermoplastic resin composition (2), wherein the thermoplastic resin continuous fiber composite material (1) is bonded to the thermoplastic resin composition (2) via a bonding surface, and a bonded part between the thermoplastic resin continuous fiber composite material (1) and the thermoplastic resin composition (2) has a tensile strength which is 0.35 times or more as strong as a tensile strength of the thermoplastic resin composition (2).

(Thermoplastic Resin Continuous Fiber Composite Material (1))

The thermoplastic resin continuous fiber composite material comprises the continuous reinforcement fiber (A) and the thermoplastic resin (B).

<Continuous Reinforcement Fiber (A)>

As the continuous reinforcement fiber (A), a fiber usually used for a fiber reinforced composite material, can be used. Although the continuous reinforcement fiber (A) is not limited to the following, examples thereof preferably include at least one selected from the group consisting of a glass fiber, a carbon fiber, an aramid fiber, a super strong polyethylene fiber, a polybenzazole fiber, a liquid crystal polyester fiber, a polyketone fiber, a metal fiber and a ceramics fiber.

In view of mechanical properties, thermal properties and general-purpose properties, a glass fiber, a carbon fiber and an aramid fiber are preferable. In view of economic efficiency, a glass fiber is preferable.

If a glass fiber is selected as the continuous reinforcement fiber (A), a sizing agent may be used. The sizing agent preferably comprises a silane coupling agent, a lubricant and a binder.

[Silane Coupling Agent]

The silane coupling agent is usually used as a surface treatment agent for a glass fiber and improves interface bond strength.

Although the silane coupling agent is not limited to the following, examples thereof include at least one selected from the group consisting of aminosilanes such as γ-aminopropyltrimethoxysilane and N-β-(aminoethyl)-γ-aminopropylmethyldimethoxysilane, mercaptosilanes such as γ-mercaptopropyltrimethoxysilane and γ-mercaptopropyltriethoxysilane; epoxysilanes; and vinylsilanes.

[Lubricant]

A lubricant improves opening property of a glass fiber.

As the lubricant, any lubricating material usually present in a liquid state or a solid state, which is suitable for a purpose, can be used. Although the lubricant is not limited to the following, examples thereof include at least one selected from animal/plant derived waxes or mineral waxes such as carnauba wax and lanolin wax; and surfactants such as a fatty acid amide, a fatty acid ester, a fatty acid ether, an aromatic ester and an aromatic ether.

[Binder]

The binder improves bundling property of a glass fiber and interface bond strength.

As the binder, a polymer or a thermoplastic resin, which is suitable for a purpose, can be used.

Examples of the polymer include, but are not limited to, a homopolymer of acrylic acid, a copolymer of acrylic acid with another copolymerizable monomer and salts thereof with a primary, secondary or tertiary amine. In addition, a polyurethane resin, which is synthesized from, for example, an isocyanate such as m-xylylene diisocyanate, 4,4'-methylenebis(cyclohexyl isocyanate) and isophorone diisocyanate; and a diol such as a polyester diol and a polyether diol, is preferably used.

The homopolymer and copolymer of acrylic acid have a weight average molecular weight of preferably 1,000 to 90,000 and more preferably 1,000 to 25,000. The weight average molecular weight herein can be determined by gel permeation chromatography (GPC) (polystyrene equivalent).

Examples of the copolymerizable monomer comprised in the copolymer of acrylic acid with another copolymerizable monomer include, but are not limited to, at least one selected from the group consisting of monomers having a hydroxyl group and/or a carboxyl group such as acrylic acid, maleic acid, methacrylic acid, vinyl acetate, crotonic acid, isocrotonic acid, fumaric acid, itaconic acid, citraconic acid and mesaconic acid (provided that use of acrylic acid alone is excluded). It is preferable that the copolymerizable monomer comprises one or more ester monomers.

Examples of the salts of the acrylic acid homopolymer and copolymer with a primary, secondary or tertiary amine, include, but are not limited to, a triethylamine salt, a triethanolamine salt and a glycine salt.

The degree of neutralization is preferably 20 to 90% and more preferably 40 to 60% in order to improve stability of a solution mixed with other chemical agents (e.g., silane coupling agent) and to reduce amine odor.

The weight average molecular weight of the acrylic acid polymer in the salt, although it is not particularly limited, preferably falls within the range of 3,000 to 50,000. The weight average molecular weight thereof is preferably 3,000 or more in view of improvement of the bundling property of a glass fiber and preferably 50,000 or less in view of improvement of the properties of a resultant composite-material molded article.

Examples of a thermoplastic resin to be used as a binder include, but are not limited to, a polyolefin resin, a polyamide resin, a polyacetal resin, a polycarbonate resin, a polyester resin, polyether ketone, polyether ether ketone, polyether sulfone, polyphenylene sulfide, thermoplastic polyetherimide, thermoplastic fluororesin and modified thermoplastic resins thereof.

A preferable thermoplastic resin to be used as a binder is a thermoplastic resin and/or a modified thermoplastic resin whose type is the same as that of the thermoplastic resin (B) (for example, continuous thermoplastic resin fiber) comprised in the thermoplastic resin continuous fiber composite material (1), because the adhesiveness between a glass fiber and the thermoplastic resin in the resultant composite-material molded article tends to improve.

The continuous thermoplastic resin fiber herein refers to a polyamide fiber and other fibers combined with the continuous reinforcement fibers such as a continuous glass fiber. The continuous thermoplastic resin fiber is hot-pressed, allowed to melt and then used as a matrix material for a thermoplastic resin continuous composite material.

In order to further improve the adhesiveness between both fibers, a sizing agent may be deposited on a glass fiber as a water dispersion. In this case, the thermoplastic resin to be used as the binder is preferably a modified thermoplastic resin in order to reduce the ratio of an emulsifier or to avoid use of an emulsifier. The modified thermoplastic resin herein refers to a thermoplastic resin obtained by copolymerizing, in addition to the monomer component that can form the main chain of the thermoplastic resin, a different monomer component for the purpose of changing the properties of the thermoplastic resin, e.g., improving hydrophilicity, crystallinity and thermodynamic properties.

Examples of the modified thermoplastic resin to be used as a binder include, but are not limited to, a modified polyolefin resin, a modified polyamide resin and a modified polyester resin.

The modified polyolefin resin serving as a binder refers to a copolymer of olefinic monomers such as ethylene and propylene and a monomer copolymerizable with the olefinic monomers such as an unsaturated carboxylic acid, and can be produced by a method known in the art. The modified polyolefin resin may be a random copolymer obtained by copolymerizing an olefinic monomer and an unsaturated carboxylic acid or a graft copolymer obtained by grafting an unsaturated carboxylic acid to an olefin.

Examples of the olefinic monomer include, but are not limited to, ethylene, propylene and 1-butene. These may be used alone or in combination with two or more.

Examples of the monomer copolymerizable with an olefinic monomer include unsaturated carboxylic acids such as acrylic acid, maleic acid, maleic anhydride, methacrylic acid, vinyl acetate, crotonic acid, isocrotonic acid, fumaric acid, itaconic acid, citraconic acid and mesaconic acid. These may be used alone or in combination of two or more.

The copolymerization ratio of an olefinic monomer and a monomer copolymerizable with the olefinic monomer is, based on the total mass of the copolymer of 100% by mass, as follows. It is preferable that the ratio of olefinic monomer is 60 to 95% by mass and the ratio of the monomer copolymerizable with the olefinic monomer is 5 to 40% by mass; and more preferable that the ratio of olefinic monomer is 70 to 85% by mass and the ratio of the monomer copolymerizable with the olefinic monomer is 15 to 30% by mass.

If the ratio of the olefinic monomer is 60% by mass or more, affinity for a matrix tends to improve. If the ratio of the olefinic monomer is 95% by mass or less, the dispersibility of the modified polyolefin resin in water improves, which enables the modified polyolefin to be readily and uniformly deposited on the continuous reinforcement fiber.

In the modified polyolefin resin to be used as a binder, modifying groups such as a carboxyl group introduced by copolymerization may be neutralized with basic compounds.

Examples of the basic compound include, but are not limited to, alkalis such as sodium hydroxide, potassium hydroxide; ammonia; and amines such as monoethanolamine and diethanolamine.

The weight average molecular weight of the modified polyolefin resin to be used as a binder, although it is not particularly limited, is preferably 5,000 to 200,000 and more preferably 50,000 to 150,000. The weight average molecular weight of the modified polyolefin resin is preferably 5,000 or more in order to improve the bundling property of a glass fiber and preferably 200,000 or less in view of emulsion stability in dispersing in water.

The modified polyamide resin to be used as a binder refers to a modified polyamide compound obtained by introducing hydrophilic groups such as a polyalkylene oxide chain and a tertiary amine component into a molecular chain thereof and can be produced by a method known in the art.

In the case where a polyalkylene oxide chain is introduced into a molecular chain, for example, a polyethylene glycol or polypropylene glycol are partly or completely modified into a diamine or a dicarboxylic acid and then copolymerized. In the case where a tertiary amine component is introduced, for example, aminoethyl piperazine, bisaminopropyl piperazine or α-dimethylamino ε-caprolactam is copolymerized.

The modified polyester resin to be used as a binder is a copolymer resin of a polycarboxylic acid or an anhydride thereof and a polyol, the resin having a hydrophilic group in a molecular skeleton including the ends thereof. The copolymer resin can be produced by a method known in the art. Examples of the hydrophilic group include a polyalkylene oxide group, a sulfonic acid salt, a carboxyl group and salts produced therefrom by neutralization.

Examples of the polycarboxylic acid or an anhydride thereof include an aromatic dicarboxylic acid, a sulfonate-containing aromatic dicarboxylic acid, an aliphatic dicarboxylic acid, an alicyclic dicarboxylic acid and a polycarboxylic acid having three or more functional groups.

Examples of the aromatic dicarboxylic acid include phthalic acid, terephthalic acid, isophthalic acid, orthophthalic acid, 1,5-naphthalene dicarboxylic acid, 2,6-naphthalene dicarboxylic acid and phthalic anhydride.

Examples of the sulfonate-containing aromatic dicarboxylic acid include sulfoterephthalate, 5-sulfoisophthalate and 5-sulfoortho phthalate.

Examples of the aliphatic dicarboxylic acid or the alicyclic dicarboxylic acid include fumaric acid, maleic acid, itaconic acid, succinic acid, adipic acid, azelaic acid, sebacic acid, dimer acid, 1,4-cyclohexane dicarboxylic acid, succinic anhydride and maleic anhydride.

Examples of the polycarboxylic acid having three or more functional groups include trimellitic acid, pyromellitic acid, trimellitic anhydride and pyromellitic anhydride.

Of these, 40 to 99 mol % of the whole polycarboxylic acid component is preferably an aromatic dicarboxylic acid, in order to improve the heat resistance of a modified polyester resin. Also, if the modified polyester resin is dispersed in water, 1 to 10 mol % of the whole polycarboxylic acid component is preferably a sulfonate-containing aromatic dicarboxylic acid in view of emulsion stability.

Examples of the polyol constituting a modified polyester resin include a diol and a polyol having three or more functional groups.

Examples of the diol include, but are not limited to, ethylene glycol, diethylene glycol, polyethylene glycol, propylene glycol, polypropylene glycol, polybutylene glycol, 1,3-propanediol, 1,4-butanediol, 1,6-hexanediol, neopentyl glycol, polytetramethylene glycol, 1,4-cyclohexanediol, 1,4-cyclohexanedimethanol, and bisphenol A or an alkylene oxide adduct thereof. Examples of the polyol having three or more functional groups include trimethylolpropane, glycerin and pentaerythritol.

The copolymerization ratio of a polycarboxylic acid or an anhydride thereof and a polyol, which constitute a modified polyester resin, is, based on 100% by mass of the total mass of the copolymer components, as follows: it is preferable that the ratio of the polycarboxylic acid or an anhydride thereof is 40 to 60% by mass and the ratio of the polyol is 40 to 60% by mass, and more preferably that ratio of the polycarboxylic acid or an anhydride thereof is 45 to 55% by mass and the ratio of the polyol is 45 to 55% by mass.

The weight average molecular weight of the modified polyester resin is preferably 3,000 to 100,000 and more preferably 10,000 to 30,000. The weight average molecular weight of the modified polyester resin is preferably 3,000 or more in order to improve the bundling property of a glass fiber and preferably 100,000 or less in view of emulsion stability when the resin is dispersed in water.

The polymers and the thermoplastic resins to be used as a binder, may be used alone or in combination of two or more.

Assuming that the total amount of binders is 100% by mass, at least one of the polymers selected from an acrylic acid homopolymer, a copolymer of acrylic acid and the other copolymerizable monomer and salts thereof with a primary, secondary or tertiary amine, is preferably used in an amount of 50% by mass or more and more preferably 60% by mass or more.

[Composition of Glass-Fiber Sizing Agent]

The glass-fiber sizing agent preferably comprises a silane coupling agent in an amount of 0.1 to 2% by mass, a lubricant in an amount of 0.01 to 1% by mass and a binder in an amount of 1 to 25% by mass. These components are diluted with water so as to control the total mass to be 100% by mass.

The content of the silane coupling agent in the glass-fiber sizing agent is preferably 0.1 to 2% by mass, more preferably 0.1 to 1% by mass and further preferably 0.2 to 0.5% by mass in order to improve the bundling property of a glass fiber, the interface bond strength and mechanical strength of the composite-material molded article.

The content of the lubricant in the glass-fiber sizing agent is preferably 0.01% by mass or more and more preferably 0.02% by mass or more in order to provide sufficient lubricity, to improve the tensile breaking strength of a yarn connected by an air splicer and to improve the opening property of the yarn in a filament combining step. In order to improve the interface bond strength and to improve the mechanical strength of the composite-material molded article, the content thereof is preferably 1% by mass or less and more preferably 0.5% by mass or less.

The content of the binder in the glass-fiber sizing agent is preferably 1 to 25% by mass, more preferably 3 to 15% by mass and further preferably 3 to 10% by mass in order to control the bundling property of a glass fiber and to improve interface bond strength and the mechanical strength of the composite-material molded article.

[Use of Glass-Fiber Sizing Agent]

The glass-fiber sizing agent may be prepared in any forms such as an aqueous solution, a colloidal dispersion and an emulsion with an emulsifier depending upon the use thereof; however, an aqueous solution is preferable in order to improve the dispersion stability and heat resistance of a sizing agent.

The glass fiber serving as the continuous reinforcement fiber (A) to be comprised in the thermoplastic resin continuous fiber composite material (1), which constitutes the composite molded article of the present embodiment, can be continuously obtained by applying the sizing agent as mentioned above to the glass fiber by known methods such as a roller applicator in a known production step of a glass fiber and drying the resultant glass fiber.

The application amount of the sizing agent, i.e., the total mass of the silane coupling agent, lubricant and binder, is preferably 0.1 to 3% by mass, more preferably 0.2 to 2% by mass and further preferably 0.2 to 1% by mass, based on 100% by mass of the glass fiber. The application amount of the sizing agent, i.e., the total mass of the silane coupling agent, lubricant and binder, is preferably 0.1% by mass or more, based on 100% by mass of the glass fiber, in order to control the bundling property of a glass fiber and to improve interface bond strength. The application amount is preferably 3% by mass or less in order to improve the tensile breaking strength of a yarn connected by an air splicer and to improve the opening property of the yarn in a filament combining step.

If a carbon fiber is selected as the continuous reinforcement fiber (A), the sizing agent preferably comprises a lubricant and a binder. The types of sizing agent, lubricant and binder are not particularly limited and those known in the art can be used. As specific materials, the materials described in Patent Literature 1 can be used.

If the other continuous reinforcement fiber (A) is used, the type and application amount of a sizing agent to be applied to a glass fiber or a carbon fiber can be appropriately selected in accordance with the properties of the continuous reinforcement fiber (A); more specifically, the type and application amount of a sizing agent are preferably controlled in accordance with those of the sizing agent for a carbon fiber.

[Number of Monofilaments of Continuous Reinforcement Fiber (A)]

The number of monofilaments of the continuous reinforcement fiber (A) is preferably 30 to 15,000 in view of opening property and handling in a filament combining step.

<Thermoplastic Resin (B)>

As the thermoplastic resin (B) comprised in the thermoplastic resin continuous fiber composite material (1), which constitutes the composite molded article of the present embodiment, a thermoplastic resin usually used in a composite-material molded article can be used. The thermoplastic resin (B) is preferably a crystalline resin because it can be processed into fibrous form.

The thermoplastic resin (B), although it is not limited, is preferably a continuous fiber obtained by subjecting at least one thermoplastic resin selected from polyolefin resins such as polyethylene and polypropylene; polyamide resins such as polyamide 6, polyamide 66 and polyamide 46; polyester resins such as polyethylene terephthalate, polybutylene terephthalate and polytrimethylene terephthalate; polyacetal resins such as polyoxymethylene; a polycarbonate resin; polyether ketone; polyether ether ketone; polyether sulfone; polyphenylene sulfide; thermoplastic polyetherimide; thermoplastic fluororesins such as a tetrafluoroethylene-ethylene copolymer; and modified thermoplastic resins thereof, to melt spinning.

Of these thermoplastic resins (B), a polyolefin resin, a polyamide resin, a polyester resin, polyether ketone, polyether ether ketone, polyether sulfone, polyphenylene sulfide, thermoplastic polyetherimide and a thermoplastic fluororesin are preferable; a polyolefin resin, a modified polyolefin resin, a polyamide resin and a polyester resin are more preferable in view of mechanical properties and general-purpose properties; and a polyamide resin and a polyester resin are further preferable in view of thermal properties in addition to the aforementioned points of view.

Also in view of durability to load repeatedly applied, a polyamide resin is further more preferable, and polyamide 66 can be suitably used.

[Polyester Resin]

The polyester resin refers to a polymer compound having a —CO—O— (ester) bond in the main chain. Examples thereof include, but are not limited to, polyethylene terephthalate, polybutylene terephthalate, polytetramethylene terephthalate, poly-1,4-cyclohexylenedimethylene terephthalate and polyethylene-2,6-naphthalenedicarboxylate.

The polyester resin may be a homo-polyester or a co-polyester. In the case of a co-polyester, a copolymer obtained by appropriately copolymerizing a third component and a homo-polyester is preferable. Examples of the third component include, but are not limited to, diol components such as diethylene glycol, neopentyl glycol and polyalkylene glycol; and dicarboxylic acid components such as adipic acid, sebacic acid, phthalic acid, isophthalic acid and 5-sodium sulfoisophthalic acid. Also, a polyester resin using a raw material derived from a biomass resource can be used. Examples thereof include, but are not limited to, aliphatic polyester resins such as polylactic acid, polybutylene succinate and polybutylene succinate adipate; and aromatic polyester resins such as polybutylene adipate terephthalate.

[Polyamide Resin]

The polyamide resin refers to a polymer compound having a —CO—NH— (amide) bond in the main chain. Examples thereof include, but are not limited to, polyamide obtained by ring opening polymerization of a lactam, a polyamide obtained by self-condensation of an ω-amino carboxylic acid; a polyamide obtained by condensation of a diamine and a dicarboxylic acid; and copolymers thereof.

The polyamide resins may be used alone or as a mixture of two or more.

Examples of the lactam include, but are not limited to, pyrrolidone, caprolactam, undecane lactam and dodecalactam.

Examples of the ω-amino carboxylic acid include, but are not limited to, an ω-amino fatty acid, which is a compound obtained by ring opening of a lactam with water.

At least two lactam monomers or ω-amino carboxylic acid monomers may be used in combination for condensation.

Examples of the diamine (monomer) include, but are not limited to, linear aliphatic diamines such as hexamethylenediamine and pentamethylenediamine; branched aliphatic diamines such as 2-methyl-pentane diamine and 2-ethylhexamethylenediamine; aromatic diamines such as p-phenylenediamine and m-phenylenediamine; and alicyclic diamines such as cyclohexanediamine, cyclopentanediamine and cyclooctanediamine.

Examples of the dicarboxylic acid (monomer) include, but are not limited to, aliphatic dicarboxylic acids such as adipic acid, pimelic acid and sebacic acid; aromatic dicarboxylic acids such as phthalic acid and isophthalic acid; and alicyclic dicarboxylic acids such as cyclohexane dicarboxylic acid.

Diamine monomers or dicarboxylic acid monomers may be used alone or in combination of two or more for condensation.

Examples of the polyamide resin include, but are not limited to, polyamide 4 (poly α-pyrrolidone), polyamide 6 (polycaproamide), polyamide 11 (polyundecanamide), polyamide 12 (polydodecanamide), polyamide 46 (polytetramethylene adipamide), polyamide 66 (polyhexamethylene adipamide), polyamide 610, polyamide 612, polyamide 6T (polyhexamethylene terephthalamide), polyamide 9T (polynonanemethylene terephthalamide), polyamide 61 (polyhexamethylene isophthalamide) and co-polyamides containing these as a component.

Examples of the co-polyamide include, but are not limited to, a copolymer of hexamethylene adipamide and hexamethylene terephthalamide, a copolymer of hexamethylene adipamide and hexamethylene isophthalamide and a copolymer of hexamethylene terephthalamide and 2-methyl pentane diamine terephthalamide.

(Form of Thermoplastic Resin Continuous Fiber Composite Material (1) as a Raw Material)

Examples of the form of the thermoplastic resin continuous fiber composite material (1) as a raw material, which constitutes the composite molded article of the present embodiment, include, but are not particularly limited to, a fabric, a prepreg obtained by impregnating a continuous reinforcement fiber with a thermoplastic resin, a sheet, a film, a powder, a granule and a pellet. In view of shape followability in the mold, operability and shape flexibility, a fabric is preferable.

A method for obtaining a fabric is not particularly limited. A method known in the art can be selected to produce a fabric suitable for a use and purpose.

For example, a woven cloth is obtained by using weaving machines such as a shuttle loom, a rapier loom, an air jet loom and a water jet loom and is satisfactory as long as a composite yarn thread is contained in at least a part. Of these methods, a woven cloth is preferably obtained by inserting wefts into warps prepared by arranging fibers containing a composite yarn thread.

A knit fabric can be obtained by knitting fibers containing a composite yarn thread in at least a part, by use of knitting machines such as a circular knitting machine, a flat knitting machine, a Tricot knitting machine and a Raschel knitting machine.

A nonwoven cloth is obtained by preparing a sheet-shaped fiber assembly called a web from fibers containing a composite yarn thread in at least a part and then binding the fibers to each other based on a physical action by a needle punching machine, a stitch bond machine and a columnar flow machine, a thermal action by e.g., an emboss roll or an adhesive.

Other forms of fabrics can be obtained by appropriately using the methods described in Patent Literature 1.

If a fabric-shaped thermoplastic resin continuous fiber composite material (1) is used as a raw material, the cross section of the fabric-shaped material has a convexo-concave structure at the interface, compared to that of a plate-like material, and thus the bonding surface to the thermoplastic resin composition injected becomes convexo-concave. As a result, the bonded area between the thermoplastic resin continuous fiber composite material (1) and the thermoplastic resin composition (2) increases and an anchor effect is produced by the thermoplastic resin continuous fiber composite material (1) and the thermoplastic resin composition (2). As a result, a higher bond strength tends to be obtained.

As the fabric-shaped thermoplastic resin continuous fiber composite material used as a raw material, a commingled yarn is preferable. A yarn obtained by dispersing or depositing a powder of a thermoplastic resin to a continuous reinforcement fiber (for example, a glass fiber and a carbon fiber) or a yarn obtained by laminating a film-shaped thermoplastic resin and a continuous reinforcement fiber may be employed.

The thermoplastic resin (B) constituting the thermoplastic resin continuous fiber composite material (1) is more preferably a continuous thermoplastic resin fiber, if a commingled yarn of the thermoplastic resin continuous fiber composite material is used as the thermoplastic resin continuous fiber composite material (1) as a raw material.

The "commingled yarn of the thermoplastic resin continuous fiber composite material" is one form of the thermoplastic resin continuous fiber composite material (1) constituting the composite molded article of the present embodiment. More specifically, the "commingled yarn of the thermoplastic resin continuous fiber composite material" is formed of the continuous reinforcement fiber (A) and the thermoplastic resin (B), in which the thermoplastic resin is a "continuous thermoplastic resin fiber" and formed by combining the continuous reinforcement fiber and the continuous thermoplastic resin fiber.

The "continuous thermoplastic resin fiber" is a fiber-shaped thermoplastic resin. Suitable examples thereof include a polyamide fiber and a polyester fiber.

A method for producing a commingled yarn from the continuous reinforcement fiber and the continuous thermoplastic resin fiber is not limited to those mentioned below. A method known in the art can be used.

Examples thereof include an opening and doubling method, which is a method of opening a continuous reinforcement fiber and/or a continuous thermoplastic resin fiber by applying external forces such as electrostatic force, pressure by a fluid spray and pressure by a roller, and then subjecting the continuous reinforcement fiber (A) and the continuous thermoplastic resin fiber serving as the thermoplastic resin (B) while the fibers are open, to doubling and arranging in parallel; and an interlace method.

Of them, the interlace method is preferable because the continuous reinforcement fiber (A) is suppressed from being damaged and has excellent opening property, and uniform combination can be made. Examples of the interlace method include a method of forming at least two vortex flow turbulence zones of fluids such as air, nitrogen gas and water vapor, virtually in parallel with the yarn axis, guiding fibers in the zones and making non-bulky yarn threads while applying tension so as not to produce loops or waviness; and a method of opening the continuous reinforcement fiber (A) alone or opening both the continuous reinforcement fiber (A) and the continuous thermoplastic resin fiber serving as the thermoplastic resin (B) and then subjecting the fiber(s) to interlacing (interlace method after opening). Particularly, it is preferable that the continuous thermoplastic resin fiber serving as the thermoplastic resin (B) alone is subjected to false twisting performed in a step including a thermal processing, and successively subjected to the interlace process performed in the same apparatus to obtain a commingled yarn.

Other information, i.e., the details of a combined filament method are referred to Patent Literature 1 and the methods described in the literature can be appropriately used.

(Thermoplastic Resin Composition (2))

In the present embodiment, the thermoplastic resin composition (2) constituting the composite molded article can be used without any limitation as long as it is a thermoplastic resin composition used in an injection molding usually performed.

As the thermoplastic resin composition (2), although it is not limited to the following, for example, one or a mixture of two or more compounds of polyethylene, polypropylene, polyvinyl chloride, an acrylic resin, a styrene resin, polyethylene terephthalate, polybutylene terephthalate, polyarylate, polyphenylene ether, modified polyphenylene ether resin, wholly aromatic polyester, polyacetal, polycarbonate, polyetherimide, polyether sulfone, a polyamide resin, polysulfone, polyether ether ketone and polyether ketone, can be used.

These thermoplastic resin compositions may comprise various fillers.

As the various fillers, a short-fiber material or a long-fiber material, which is a non-continuous reinforcement material formed of the same material as used in the continuous reinforcement fiber (A), may be used.

In the case where a short glass fiber or a long glass fiber is used as the non-continuous reinforcement material, a sizing agent may be used in the same manner as in the continuous reinforcement fiber (A). The sizing agent preferably comprises a silane coupling agent, a lubricant and a binder.

The types of the silane coupling agent, lubricant and binder are the same as those in the sizing agent for the continuous reinforcement fiber (A) mentioned above.

The resin material of the thermoplastic resin composition (2) is preferably analogous to the thermoplastic resin (B) constituting the thermoplastic resin continuous fiber composite material (1), and more preferably the same as the resin (B) in view of the bond strength between the thermoplastic resin continuous fiber composite material (1) and the thermoplastic resin composition (2) of the composite molded article of the present embodiment.

In a specific case where polyamide 66 fiber is used as the thermoplastic resin (A) constituting the thermoplastic resin continuous fiber composite material (1), the resin material of the thermoplastic resin composition (2) is preferably polyamide 66.

[Properties of Composite Molded Article]

In the composite molded article of the present embodiment, the tensile strength of the bonded part between the thermoplastic resin continuous fiber composite material (1) and the thermoplastic resin composition (2) is 0.35 times or more, preferably 0.5 times or more, and more preferably 1.0 time or more as strong as the tensile strength of the thermoplastic resin composition (2).

The tensile strength of the bonded part herein is determined based on measurement of the tensile strength by a tensile test.

If the composite molded article broke at the bonded part, a molded article consisting only of the thermoplastic resin composition (2) is cut out, and the tensile strength thereof is measured and compared to the tensile strength of the bonded part.

If the composite molded article broke at the portion of the thermoplastic resin composition (2), the tensile strength of the bonded part is determined to be 1.0 time or more as strong as the tensile strength of the thermoplastic resin composition (2).

The tensile test herein can be carried out in accordance with the method later described in the <Examples> to measure the tensile strength of the bonded part and the tensile strength of the thermoplastic resin composition.

In the composite molded article of the present embodiment, the bonded part between the thermoplastic resin continuous fiber composite material (1) and the thermoplastic resin composition (2) preferably has a convexo-concave structure where the material (1) and the composition (2) are mixed with each other, in view of bond strength.

In the bonding surface between the thermoplastic resin continuous fiber composite material (1) and the thermoplastic resin composition (2), the length L of the interface and the thickness t of the composite molded article (3) satisfy the following relation, preferably L>1.8t, more preferably L>2.0t and further more preferably L>3.0t.

If L and t satisfy the above relation, the bonded area between the thermoplastic resin continuous fiber composite material (1) and the thermoplastic resin composition (2) increases and an anchor effect is produced by the thermoplastic resin continuous fiber composite material (1) and the thermoplastic resin composition (2). As a result, a higher bond strength tends to be obtained.

The length L of the interface and the thickness t of the composite molded article can be measured in accordance with the method described later in <Examples>.

The interface usually refers to the interface formed by the continuous reinforcement fiber (A) comprised in the thermoplastic resin continuous fiber composite material (1) and the non-continuous reinforcement material comprised in the thermoplastic resin composition (2).

[Method for Producing Composite Molded Article]

A method for producing the composite molded article of the present embodiment will be described.

The method for producing the composite molded article of the present embodiment is a method for producing a composite molded article comprising: a thermoplastic resin continuous fiber composite material (1) comprising a continuous reinforcement fiber (A) and a thermoplastic resin (B); and a thermoplastic resin composition (2), in which the thermoplastic resin continuous fiber composite material (1) is bonded to the thermoplastic resin composition (2) via a bonding surface, comprising a step of shaping the thermoplastic resin continuous fiber composite material (1) in a mold, a step of injecting the thermoplastic resin composition (2) into the mold, and a step of bonding the thermoplastic resin continuous fiber composite material (1) and the thermoplastic resin composition (2).

The method for producing the composite molded article of the present embodiment is not limited to the following examples and various forms of the thermoplastic resin continuous fiber composite material (1) can be applied.

For example, the thermoplastic resin continuous fiber composite material (1) as a raw material, preferably a fabric-shaped material, is cut in accordance with a desired composite molded article. In consideration of the thickness of a product, a required number of the fabric-shaped materials are laminated and set so as to follow the shape of a mold. At this time, the fabric-shaped material has a high degree of freedom to the mold, compared to a conventional composite plate formed by impregnating a commonly used reinforcement fiber with a resin. Even if a composite molded article has a difference in height, the degree of shape freedom in molding can be high. Furthermore, if a fabric-shaped material is selected as the thermoplastic resin continuous fiber composite material (1), since edge portions thereof not melted contain many void spaces, the thermoplastic resin composition (2) enters into the void spaces in the step of bonding the thermoplastic resin continuous fiber composite material (1) and the thermoplastic resin composition (2), with the result that the bonded area increases, and an anchor effect becomes strong. Because of this, the bond strength tends to be improved.

(Step of shaping thermoplastic resin continuous fiber composite material (1) in mold)

After a material is set in a mold, whose temperature is controlled to be the melting point or less of the thermoplastic resin (B) constituting the thermoplastic resin continuous fiber composite material, the mold is closed and compressed to shape the material.

Although it is not particularly limited, the mold clamping pressure is preferably 1 MPa or more and more preferably 3 MPa or more. After the mold is once clamped and compressed, the mold clamping pressure applied to the mold may be once released in order to release e.g., a gas.

(Step of injecting the thermoplastic resin composition (2) into the mold and step of bonding the thermoplastic resin continuous fiber composite material (1) and the thermoplastic resin composition (2))

The thermoplastic resin continuous fiber composite material (1) is set in the mold and the mold is closed. After a predetermined time, the thermoplastic resin composition (2) is injected and molded to allow the thermoplastic resin continuous fiber composite material (1) to bond to the thermoplastic resin composition (2). In this manner, the composite molded article of the present embodiment, which is a hybrid molded article, can be obtained.

In the method for producing the composite molded article of the present embodiment, it is preferable that, after the step of injecting the thermoplastic resin composition (2) into the mold, the step of compressing and molding the thermoplastic resin continuous fiber composite material (1) and the thermoplastic resin composition (2) in the mold having a temperature equal to or higher than the melting point of the thermoplastic resin (B), is carried out.

In the case where compression molding of the thermoplastic resin continuous fiber composite material (1) and the thermoplastic resin composition (2) is carried out after the step of injecting the thermoplastic resin composition (2), the mold temperature in the step of injecting the thermoplastic resin composition (2) into the mold is preferable controlled to be equal to or lower than the melting point of the thermoplastic resin (B). More specifically, the mold temperature in the injection step is preferably the melting point of the thermoplastic resin (B)—100° C., or more; or the glass transition temperature—50° C., or more; more preferably the melting point—50° C., or more; or the glass transition temperature—25° C., or more; and further preferably the melting point—10° C., or more; or glass transition temperature or more.

In the method for producing the composite molded article of the present embodiment, it is preferable that the press pressure to be applied to the thermoplastic resin continuous fiber composite material (1) at the time of compression molding is equal to the injection pressure or injection-holding pressure to be applied when the thermoplastic resin composition (2) is injected. If the press pressure is higher than the injection pressure or injection-holding pressure, thermoplastic resin (B) comprised in the thermoplastic resin continuous fiber composite material (1) flows out during melting. As a result, a portion having no reinforcement fiber emerges. The portion tends to be easily broken. In contrast, if the injection pressure or injection-holding pressure is higher than the press pressure, the press pressure succumbs to the injection pressure or injection-holding pressure and the thermoplastic resin continuous fiber composite material (1) is pressed, with the result that the orientation of the reinforcement fibers comprised in the material (1) tends to be destroyed.

The equal pressure herein is not necessary to be the same pressure and also includes difference in pressure of ±10 MPa and preferably ±5 MPa. The injection-holding pressure herein means the holding pressure during the injection molding.

In another embodiment, after the step of shaping the thermoplastic resin continuous fiber composite material (1) in a mold, a step of compressing and molding the thermoplastic resin continuous fiber composite material (1) in the mold having a temperature equal to or higher than the melting point of the thermoplastic resin (B) may be further included.

If this method is employed, in the step of injecting the thermoplastic resin composition (2) into the mold, it is preferable that injection is made when the mold has the temperature equal to or higher than the melting point of the thermoplastic resin (B). The temperature of the mold when the thermoplastic resin composition (2) is injected is more preferably the melting point of thermoplastic resin (B)

constituting the thermoplastic resin continuous fiber composite material (1)+10° C., or more; or the glass transition temperature thereof+10° C., or more; further preferably the melting point+20° C., or more; or the glass transition temperature+20° C., or more; still further preferably, the melting point+30° C., or more; or the glass transition temperature+30° C., or more.

The temperature of the mold into which the thermoplastic resin composition (2) is injected, is the melting point of the thermoplastic resin (B) constituting the thermoplastic resin continuous fiber composite material (1)+50° C., or less; and the glass transition temperature thereof+50° C., or less.

At this time, the timing of injecting the thermoplastic resin composition (2) preferably falls within 30 seconds after the thermoplastic resin continuous fiber composite material (1) is set in the mold and the mold is closed.

The edge-surface temperature of the thermoplastic resin continuous fiber composite material (1) inserted in a mold when the thermoplastic resin composition (2) is injected, preferably falls within the melting point of the thermoplastic resin (B) constituting thermoplastic resin continuous fiber composite material (1) ±10° C.

The edge-surface temperature of the thermoplastic resin continuous fiber composite material (1) herein refers to the temperature of a portion thereof to be into contact with the thermoplastic resin composition to be injected.

In the method for producing the composite molded article of the present embodiment, it is preferable that the press pressure to be applied to the thermoplastic resin continuous fiber composite material (1) when press molding is performed, is equal to the injection pressure or injection-holding pressure to be applied when the thermoplastic resin composition (2) is injected.

In the composite molded article of the present embodiment, as mentioned above, the thermoplastic resin continuous fiber composite material (1) is bonded to the thermoplastic resin composition (2) via a bonding surface. The tensile strength of the bonded part between the thermoplastic resin continuous fiber composite material (1) and the thermoplastic resin composition (2) is 0.35 times or more, preferably 0.5 times or more and more preferably 1.0 time or more as strong as the tensile strength of the thermoplastic resin composition (2).

As described above, in order to set the tensile strength of the bonded part between the thermoplastic resin continuous fiber composite material (1) and the thermoplastic resin composition (2) to be 0.35 times or more as strong as the tensile strength of the thermoplastic resin composition (2), it is effective that thermoplastic resin continuous fiber composite material (1) and the thermoplastic resin composition (2) are bonded and then compression-molded in a mold having a temperature equal to or higher than the melting point.

In order to set the tensile strength of the bonded part to be 0.5 times or more as strong as the tensile strength of the thermoplastic resin composition (2), it is effective that a fabric-shaped material is selected as the thermoplastic resin continuous fiber composite material (1), in addition to bonding the thermoplastic resin continuous fiber composite material (1) and the thermoplastic resin composition (2) and then compression molding in a mold having a temperature equal to or higher than the melting point.

In order to set the tensile strength of the bonded part to be 1.0 time or more as strong as the tensile strength of the thermoplastic resin composition (2), it is effective that the press pressure is controlled to be equal to the injection pressure or injection-holding pressure; and the injection-holding pressure is maintained for a long time, for example, 5 seconds or more, preferably 10 seconds or more, and more preferably a time period during which the mold comes to have a temperature which is equal to or lower than the solidification temperatures of the thermoplastic resin (B) comprised in the thermoplastic resin continuous fiber composite material (1) and the thermoplastic resin composition (2), in addition to bonding the thermoplastic resin continuous fiber composite material (1) and the thermoplastic resin composition (2) and then compression molding in a mold having a temperature equal to or higher than the melting point; and selecting a fabric-shaped material as the thermoplastic resin continuous fiber composite material (1).

EXAMPLES

The present invention will be described by way of Examples and Comparative Examples; however, the present embodiment is not limited to the following Examples.

Evaluation methods for individual physical properties in Examples and Comparative Examples are as follows.

(Method for Observing Cross Section)

Figure 3:
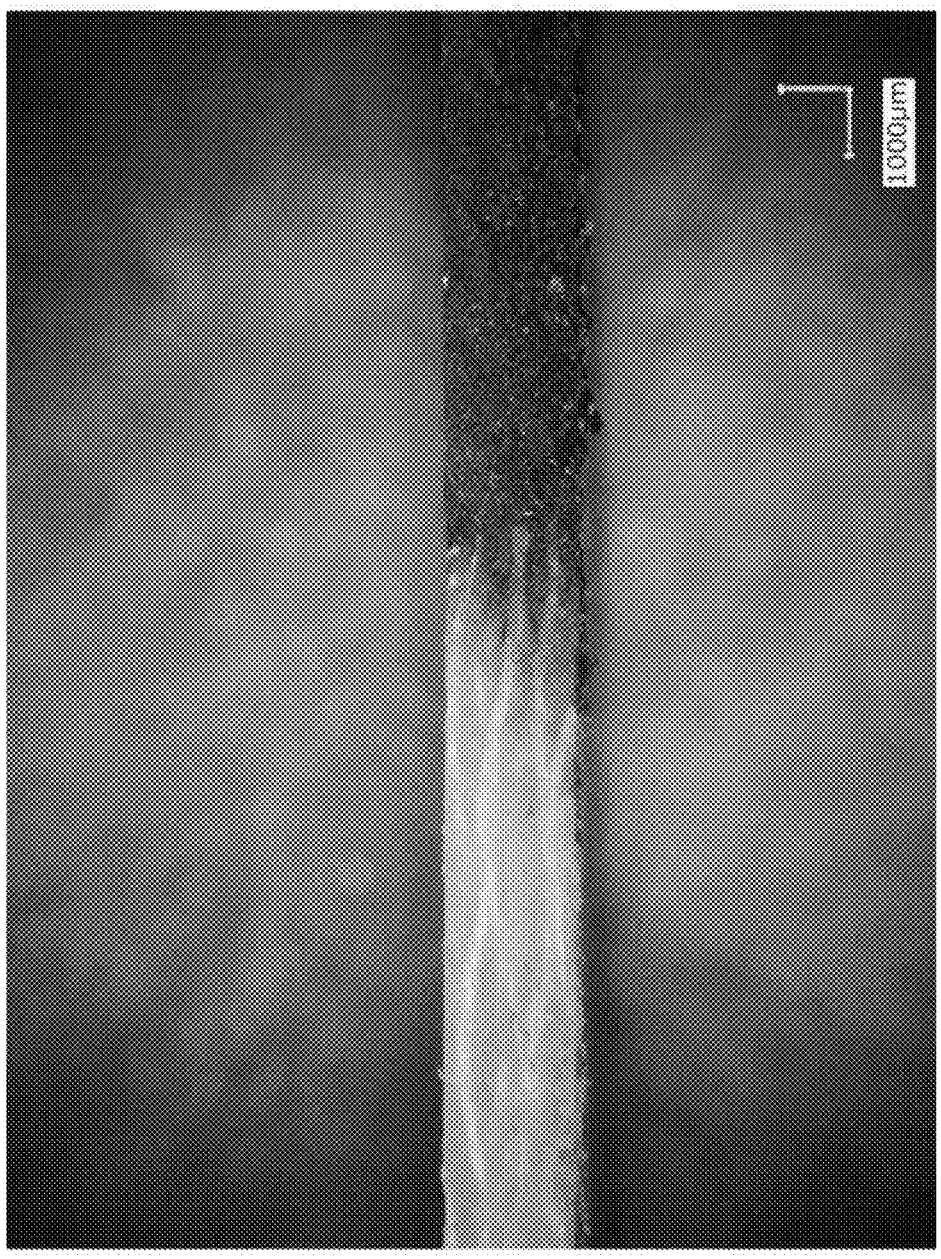
FIG. 3 shows a cross-sectional view of a bonded part of a composite molded article according to the present embodiment.
Figure 4:
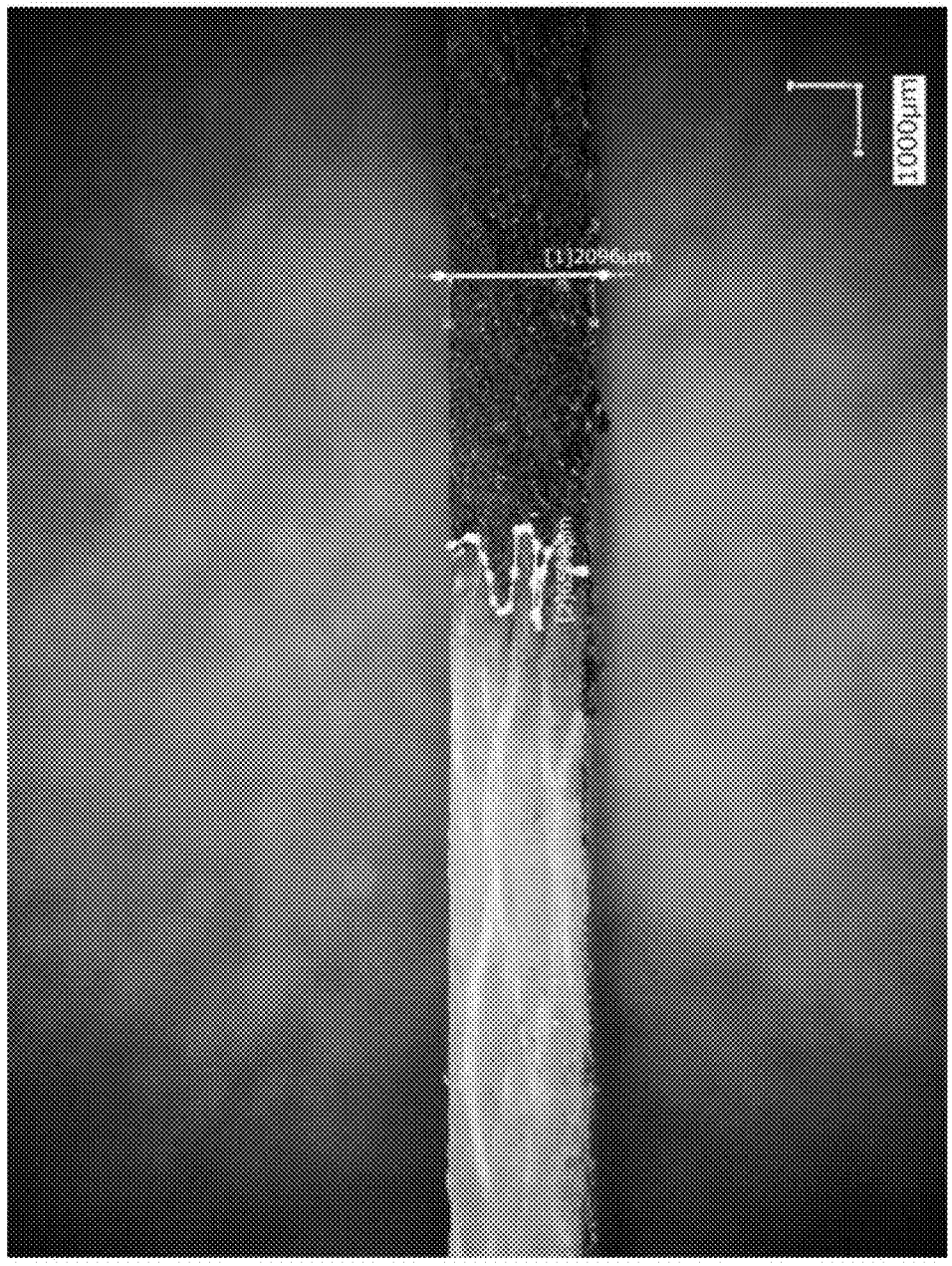
FIG. 4 shows length L and thickness t according to the present embodiment.

The bonding-surface portion of a test piece was polished, and a cross section thereof was observed by use of a digital microscope (trade name "VHX1000" manufactured by KEYENCE CORPORATION) as shown in FIG. 3. Subsequently, as shown in FIG. 4, the length of the interface L at the bonding surface between the thermoplastic resin continuous fiber composite material (1) and the thermoplastic resin composition (2); and the thickness t of the composite molded article (3) were measured. If the resin comprised in the thermoplastic resin continuous fiber composite material (1) and the resin comprised in the thermoplastic resin composition (2) have the same color and the interface between them is difficult to distinguish, binarization was performed by using image processing software to clearly distinguish the interface in the bonding surface.

(Tensile Test Method)

A test piece was chucked at intervals of 50 mm in the longitudinal direction and tensile strength was measured by a universal testing machine (trade name: "Instron 5581", manufactured by Instron) at a rate of 5 mm/min in the environment of 23° C., 50% RH.

Example 1

A glass fiber (number of monofilaments: 400, fineness 685 dtex), on which 1.0% by mass of the sizing agent a described below was deposited, was used as the continuous reinforcement fiber (A).

(Composition (Solid Content) of Sizing Agent a):

Silane coupling agent: γ-Aminopropyltriethoxysilane 0.6% by mass [trade name: KBE-903 (manufactured by Shin-Etsu Chemical Co., Ltd.)]

Lubricant: Wax 0.1% by mass [trade name: carnauba wax (manufactured by S. KATO & CO.)]

Binder: Acrylic acid/maleic acid copolymer salt: 5% by mass [trade name: Aqualic TL (manufactured by NIPPON SHOKUBAI CO., LTD)]

As the thermoplastic resin (B), polyamide 66 fiber to which an interlace treatment was not applied [trade name: Leona® 470/144BAU (manufactured by Asahi Kasei Fiber Corporation), fineness: 470 dtex, number of monofilaments: 144] was used. The melting point of the thermoplastic resin (B) was 265° C.

Two bundles of a glass fiber (fineness: 685 dtex, number of monofilaments: 400) as the continuous reinforcement fiber (A) and two bundles of a PA fiber (fineness: 470 dtex) as the thermoplastic resin (B) were doubled, arranged in parallel, supplied substantially in vertical to an interlace nozzle, and subjected to interlacing in the following conditions to obtain a composite yarn thread.

Interlace nozzle: Kyocera Corporation, KC-AJI-L (1.5 mm in diameter, propulsive nozzle)
Air pressure: 2 kg/cm$^2$ (Example 1)
Processing rate: 30 m/minute The composite yarn thread was used as a warp and a weft to weave a woven cloth having a warp density of 6 warps/5 mm and a weft density of 6 wefts/5 mm (fabric: the thermoplastic resin continuous fiber composite material (1) as a raw material).

Weaving performance was satisfactory as fluff and fibrillated substance did not occur during weaving and no attachment of yarn waste or hair ball to a loom was observed.

Next, a hybrid molded article was produced by using the above woven cloth (fabric: the thermoplastic resin continuous fiber composite material (1) as a raw material).

As the hybrid molded article, a flat-plate composite molded article shown in FIG. 1 (length: 250 mm, width: 250 mm, thickness: 2.0 mm) was produced in accordance with the following procedure.

The composite molded article 1 shown in FIG. 1 comprises: a compression molded portion 2 comprising the thermoplastic resin continuous fiber composite material (1); and an injection molded portion 3 comprising the thermoplastic resin composition (2).

Figure 2:
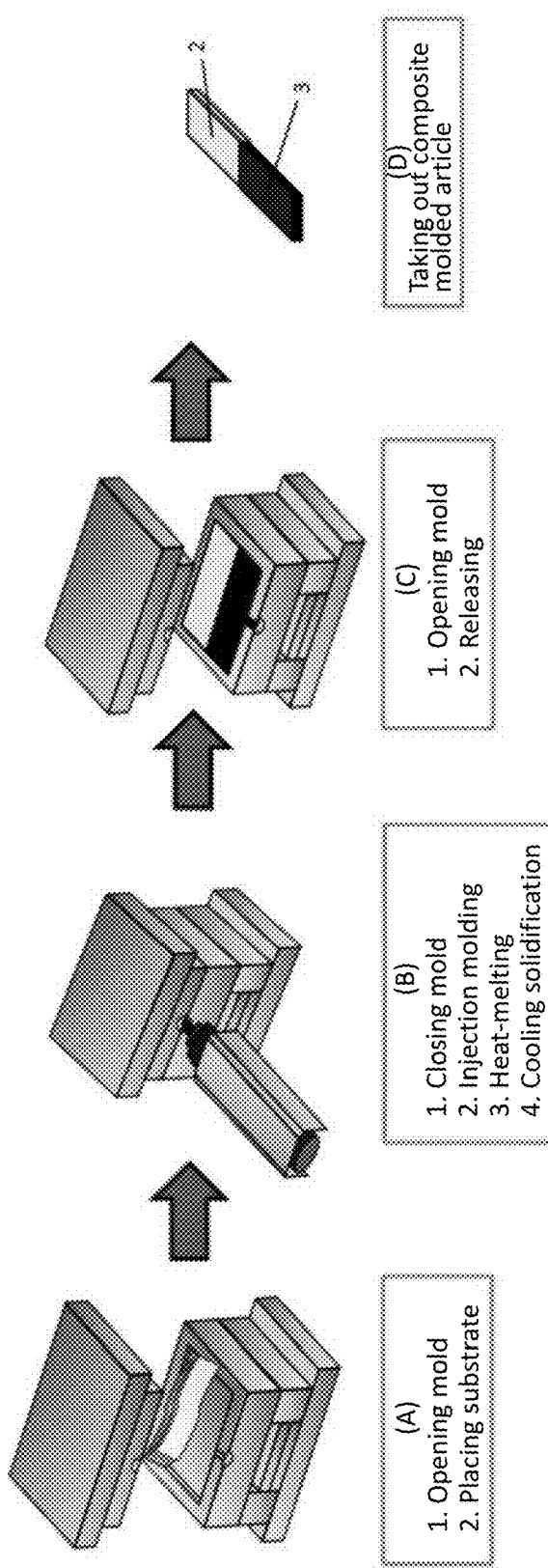
FIGS. 2(A) to (D) schematically show molding steps of a composite molded article according to the present embodiment.

FIGS. 2 (A) to (D) show a production process of a composite molded article, including a compression molding step and an injection molding step.

As the molding machine, S100V-8A having a maximum clamping force of 300 t and manufactured by TOSHIBA MACHINE CO., LTD, was used.

(Step of Cutting Fabric):

The fabric produced as mentioned above was molded and then cut into pieces (width: 250 mm, height: 125 mm) so as to obtain the shape indicated by reference number 2 in FIG. 1.

(Step of shaping fabric): As shown in FIG. 2 (A), a mold heated to 150° C. was opened, and seven fabric pieces cut into the above desired shape were set at a predetermined position within the mold and then the mold was clamped by applying a clamping force of 90 t to perform shaping.

(Injection/bonding/compression molding step): After the clamping, the temperature of the mold was raised to 255° C. While keeping the temperature, as shown in FIG. 2 (B), a resin composition of polyamide 66 resin comprising 33% of short fiber GF [trade name: Leona® 14G33] was injected at a cylinder temperature of 290° C., an injection pressure of 20 MPa and an injection rate of 50 mm/sec, and then, an injection-holding pressure of 10 MPa was applied. After completion of the injection molding step, the temperature of the mold was raised to 300° C., which is a temperature equal to or higher than the melting point of the thermoplastic resin (B), and maintained for 3 minutes. In this manner, compression molding was performed.

(Cooling step): Then, the mold was cooled to 150° C. to perform cooling solidification.

(Release step): The mold was opened as shown in FIG. 2 (C) and a flat-plate composite molded article having a shape as shown in FIG. 1 was taken out, as shown in FIG. 2 (D).

After the composite molded article was taken out, five strip-shaped molded articles (length: 100 mm, width: 10 mm) were cut out as shown by a dashed line in FIG. 1 to obtain test pieces. Observation of the cross sections and a tensile test were carried out in accordance with the methods mentioned above.

The length L of the interface at the bonding surface between the thermoplastic resin continuous fiber composite material (1) and the thermoplastic resin composition (2) was measured with respect to the five test pieces. As a result, the average value of the length L was 6.6 mm and the average value of the thickness t was 2.10 mm. A relation of L>1.8t was satisfied.

As a result of the tensile test, the test pieces broke at the bonded part. At this time, the average value of the tensile strength was 75 MPa. Further, the thermoplastic resin composition (2) alone was cut out and subjected to the tensile test. As a result, the average value of the tensile strength was 137 MPa.

The tensile strength of the bonded part was about 0.55 times as strong as the tensile strength of the thermoplastic resin (2).

Example 2

A hybrid molded article was produced using the same woven cloth as in Example 1 (fabric: the thermoplastic resin continuous fiber composite material (1) as a raw material).

As the hybrid molded article, the flat-plate composite molded article as shown in FIG. 1 (length: 250 mm, width: 250 mm, thickness: 2.0 mm) was produced in accordance with the following procedure.

(Step of Cutting Fabric):

The fabric produced as mentioned above was cut into pieces (width: 250 mm, height: 125 mm) so as to obtain the shape indicated by reference number 2 in FIG. 1.

(Step of shaping fabric): As shown in FIG. 2 (A), a mold heated to 150° C. was opened, and seven fabric pieces cut into the above desired shape were set at a predetermined position within the mold and then the mold was clamped by applying a clamping force of 65 t to perform shaping.

(Injection/bonding/compression molding step): After the clamping, the temperature of the mold was raised to 255° C. While keeping the temperature, as shown in FIG. 2 (B), a resin composition of polyamide 66 resin containing 33% of short fiber GF [trade name: Leona® 14G33] was injected at a cylinder temperature of 290° C., an injection pressure of 20 MPa and an injection rate of 50 mm/sec, and then an injection-holding pressure of 20 MPa was applied. After completion of the injection step, the temperature of the mold was raised to 300° C., which is a temperature equal to or higher than the melting point of the thermoplastic resin (B), and maintained for 3 minutes. In this manner, compression molding was performed.

(Cooling step): Then, the mold was cooled to 150° C. to perform cooling solidification. The injection-holding pressure was maintained at 20 MPa until the temperature reached 200° C., which is a solidification temperature or less of the thermoplastic resin (B).

(Release step): The mold was opened and a flat-plate composite molded article as in Example 1 was taken out.

After the composite molded article was taken out, five strip-shaped molded articles as in Example 1 (length: 100 mm, width: 10 mm) were cut out to obtain test pieces. Observation of the cross sections and a tensile test were carried out in accordance with the methods mentioned above.

The length L of the interface at the bonding surface between the thermoplastic resin continuous fiber composite material (1) and the thermoplastic resin composition (2) was measured with respect to the five test pieces. As a result, the average value of the length L was 5.7 mm and the average value of the thickness t was 1.90 mm. The relation of L>1.8t was satisfied.

The results of the tensile test are shown in FIG. 5.

Interface fracture in the tensile test occurred at the injection molded part (portion indicated by reference number 3 in FIG. 1) formed of the thermoplastic resin composition (2). It was found that the strength of the bonded part between the compression molded portion 2 and the injection molded portion 3 was 1.0 time or more as strong as the strength of the thermoplastic resin composition. Fracture occurred in the portion of the thermoplastic resin composition (portion indicated by reference number 3 in FIG. 1) in all other test pieces.

Example 3

A hybrid molded article was produced using the same woven cloth as in Example 1 (fabric: the thermoplastic resin continuous fiber composite material (1) as a raw material).

As the hybrid molded article, the flat-plate composite molded article as shown in FIG. 1 (length: 250 mm, width: 250 mm, thickness: 2.0 mm) was produced in accordance with the following procedure.

(Step of cutting fabric): The fabric produced as mentioned above was cut into pieces (width: 250 mm, height: 125 mm) so as to obtain the shape indicated by reference number 2 in FIG. 1.

(Step of shaping fabric): As shown in FIG. 2 (A), a mold heated to 300° C. was opened, and seven fabric pieces cut into the above desired shape were set at a predetermined position within the mold and then the mold was clamped by applying a clamping force of 90 t to perform shaping.

(Injection/bonding/compression molding step): After the clamping, a resin composition of polyamide 66 resin comprising 33% of short fiber GF [trade name: Leona® 14G33] was injected at a cylinder temperature of 290° C., an injection pressure of 20 MPa and an injection rate of 50 mm/sec, and then an injection-holding pressure of 10 MPa was applied. After completion of the injection molding step, the temperature of the mold was raised to 300° C., which is a temperature equal to or higher than the melting point of the thermoplastic resin (B), and maintained for 3 minutes. In this manner, compression molding was performed.

(Cooling step): Then, the mold was cooled to 150° C. to perform cooling solidification.

(Release step): The mold was opened and a flat-plate composite molded article as in Examples 1 and 2 was taken out.

After the composite molded article was taken out, five strip-shaped molded articles as in Example 1 (length: 100 mm, width: 10 mm) were cut out to obtain test pieces. Observation of the cross sections and a tensile test were carried out in accordance with the methods mentioned above.

The length L of the interface at the bonding surface between the thermoplastic resin continuous fiber composite material (1) and the thermoplastic resin composition (2) was measured with respect to the five test pieces. As a result, the average value of the length L was 5.3 mm and the average value of the thickness t was 1.90 mm. The relation of L>1.8t was satisfied.

As a result of the tensile test, the test pieces broke at the bonded part. The average value of the tensile strength at this time was 69 MPa. Furthermore, the thermoplastic resin composition (2) alone was cut out and subjected to the tensile test. As a result, the average value of the tensile strength was 137 MPa.

The tensile strength of the bonded part was about 0.50 times as strong as the tensile strength of the thermoplastic resin (2).

Example 4

A glass fiber (number of monofilament: 400, fineness 685 dtex), on which the sizing agent a (1.0% by mass) described below was deposited, was used as the continuous reinforcement fiber (A).

(Composition (Solid Content) of Sizing Agent a):

Silane coupling agent: γ-Aminopropyltriethoxysilane 0.6% by mass <trade name: KBE-903 (manufactured by Shin-Etsu Chemical Co., Ltd.)>

Lubricant: Wax 0.1% by mass <trade name: carnauba wax (manufactured by S. KATO & CO.)>

Binder: Acrylic acid/maleic acid copolymer salt: 5% by mass <trade name: Aqualic TL (manufactured by NIPPON SHOKUBAI CO., LTD)>

As the thermoplastic resin (B), polyamide 66 fiber to which an interlace treatment was not applied <trade name: Leona® 470/144BAU (manufactured by Asahi Kasei Fiber Corporation), fineness: 470 dtex, number of monofilaments: 144> was used. The melting point of the thermoplastic resin (B) was 265° C.

Two bundles of a glass fiber (fineness: 685 dtex, number of monofilaments: 400) as the continuous reinforcement fiber (A) and two bundles of a PA fiber (fineness: 470 dtex) as the thermoplastic resin (B) were doubled, arranged in parallel, supplied substantially in vertical to an interlace nozzle, and subjected to interlacing in the following conditions to obtain a composite yarn thread.

Interlace nozzle: Kyocera Corporation, KC-AJI-L (1.5 mm in diameter, propulsive nozzle)

Air pressure: 2 kg/cm$^2$ (Example 1)

Processing rate: 30 m/minute

The composite yarn thread obtained was used as a warp and a weft to weave a woven cloth having a warp density of 6 warps/5 mm and a weft density of 6 wefts/5 mm (fabric: the thermoplastic resin continuous fiber composite material (1) as a raw material).

Weaving performance was satisfactory as fluff and fibrillated substance did not occur during weaving and no attachment of yarn waste or hair ball to a loom was observed.

Next, a prepreg material was produced using the woven cloth (fabric: the thermoplastic resin continuous fiber composite material (1) as a raw material).

Seven fabric pieces were sandwiched by two iron plates attached with a formwork having a thickness of 2.0 mm, put into a compression molding machine heated to 300° C., heated for 10 minutes while applying a compressive force of 5 MPa, then transferred onto a cooled plate and cooled for 5 minutes to produce a plate-shaped prepreg.

Subsequently, a hybrid molded article was prepared using the prepreg material.

As the hybrid molded article, a flat-plate composite molded article shown in FIG. 1 (length: 250 mm, width: 250 mm, thickness: 2.0 mm) was produced in accordance with the following procedure.

(Step of cutting prepreg material): The prepreg material prepared as mentioned above was molded and cut into pieces (width: 250 mm, height: 125 mm) so as to obtain a shape indicated by reference number 2 in FIG. 1.

(Step of preheating prepreg material): The prepreg material was preliminary heated to 300° C. by a short wavelength infrared heater manufactured by Heraeus.

(Step of shaping fabric): As shown in FIG. 2 (A), the mold heated to 300° C. was opened. The prepreg material, which was cut into the above desired shape and preliminary heated, was set at a predetermined position within the mold and then the mold was clamped by applying a clamping force of 90 t to perform shaping.

(Injection/bonding/compression molding step): After the clamping, a resin composition of polyamide 66 resin comprising 33% of short fiber GF 33 [trade name: Leona® 14G33] was injected at a cylinder temperature of 290° C., an injection pressure of 20 MPa and an injection rate of 50 mm/sec, and then an injection-holding pressure of 10 MPa was applied, as shown in FIG. 2(B). After completion of the injection molding step, this condition was maintained for 3 minutes. In this manner, compression molding was performed.

(Cooling step): Then, the mold was cooled to 150° C. to perform cooling solidification.

(Release step): The mold was opened and a flat-plate composite molded article as in Example 1 was taken out.

After the composite molded article was taken out, five strip-shaped molded articles as in Example 1 (length: 100 mm, width: 10 mm) were cut out to obtain test pieces. Observation of the cross sections and a tensile test were carried out in accordance with the methods mentioned above.

The length L of the interface at the bonding surface between the thermoplastic resin continuous fiber composite material (1) and the thermoplastic resin composition (2) was measured with respect to the five test pieces. As a result, the average value of the length L was 4.2 mm and the average value of the thickness t was 2.01 mm. A relation of L>1.8t was satisfied.

As a result of the tensile test, the test pieces broke at the bonded part. At this time, the average value of the tensile strength was 50 MPa. Further, the thermoplastic resin composition (2) alone was cut out and subjected to the tensile test. As a result, the average value of the tensile strength was 137 MPa.

The tensile strength of the bonded part was about 0.36 times as strong as the tensile strength of the thermoplastic resin (2).

Comparative Example 1

A hybrid molded article was produced using the same prepreg material as in Example 4.

As the hybrid molded article, the flat-plate composite molded article as shown in FIG. 1 (length: 250 mm, width: 250 mm, thickness: 2.0 mm) was produced in accordance with the following procedure.

(Step of cutting prepreg material): The prepreg material produced as mentioned above was molded and then cut into pieces (width: 250 mm, height: 125 mm) so as to have a shape indicated by reference number 2 in FIG. 1.

(Step of preheating prepreg material): The prepreg material was preliminary heated to 300° C. by a short wavelength infrared heater manufactured by Heraeus.

(Step of shaping fabric): The mold heated to 150° C. was opened. The prepreg material, which was cut into the above desired shape and preliminary heated, was set at a predetermined position within the mold and then the mold was clamped by applying a clamping force of 90 t to perform shaping.

(Injection/bonding/compression molding step): After the clamping, a resin composition of polyamide 66 resin comprising 33% of short fiber GF [trade name: Leona® 14G33] was injected at a cylinder temperature of 290° C., an injection pressure of 20 MPa and an injection rate of 50 mm/sec, and then an injection-holding pressure of 10 MPa was applied. After completion of the injection molding step, this condition was maintained for 3 minutes. In this manner, compression molding was performed.

(Cooling step): Then, the mold was cooled to 100° C. to perform cooling solidification.

(Release step): The mold was opened and a flat-plate composite molded article as in Example 1 was taken out.

After the composite molded article was taken out, five strip-shaped molded articles (length: 100 mm, width: 10 mm) were cut out to obtain test pieces. Observation of the cross sections and a tensile test were carried out in accordance with the methods mentioned above.

The length L of the interface at the bonding surface between the thermoplastic resin continuous fiber composite material (1) and the thermoplastic resin composition (2) was measured with respect to the five test pieces. As a result, the average value of the length L was 2.3 mm and the average value of the thickness t was 1.89 mm. The relation of L=1.2t was obtained.

As a result of the tensile test, the test pieces broke at the bonded part. The average value of the tensile strength at this time was 20 MPa. Furthermore, the thermoplastic resin composition (2) alone was cut out and subjected to the tensile test. As a result, the average value of the tensile strength was 134 MPa.

The tensile strength of the bonded part was about 0.15 times as strong as the tensile strength of the thermoplastic resin (2).

Comparative Example 2

A hybrid molded article was produced using the same prepreg material as in Example 4.

As the hybrid molded article, the flat-plate composite molded article as shown in FIG. 1 (length: 250 mm, width: 250 mm, thickness: 2.0 mm) was produced in accordance with the following procedure.

(Step of cutting prepreg material): The prepreg material produced as mentioned above was molded and then cut into pieces (width: 250 mm, height: 125 mm) so as to have a shape indicated by reference number 2 in FIG. 1.

(Step of preheating prepreg material): The prepreg material was preliminary heated to 300° C. by a short wavelength infrared heater manufactured by Heraeus.

(Step of shaping fabric): The mold heated to 200° C. was opened. The prepreg material, which was cut into the above desired shape and preliminary heated, was set at a predetermined position within the mold and then the mold was clamped by applying a clamping force of 90 t to perform shaping.

(Injection/bonding/compression molding step): After clamping, a resin composition of polyamide 66 resin comprising 33% of short fiber GF [trade name: Leona® 14G33] was injected at a cylinder temperature of 290° C., an injection pressure of 20 MPa and an injection rate of 50 mm/sec, and then an injection-holding pressure of 10 MPa was applied. After completion of the injection molding step, this condition was maintained for 3 minutes. In this manner, compression molding was performed.

(Cooling step): Then, the mold was cooled to 100° C. to perform cooling solidification.

(Release step): The mold was opened and a flat-plate composite molded article as in Example 1 was taken out.

After the composite molded article was taken out, five strip-shaped molded articles (length: 100 mm, width: 10 mm) were cut out to obtain test pieces. Observation of the cross sections and a tensile test were carried out in accordance with the methods mentioned above.

The length L of the interface at the bonding surface between the thermoplastic resin continuous fiber composite material (1) and the thermoplastic resin composition (2) was measured with respect to the five test pieces. As a result, the average value of the length L was 3.2 mm and the average value of the thickness t was 1.87 mm. The relation of L=1.7t was obtained.

As a result of the tensile test, the test pieces broke at the bonded part. The average value of the tensile strength at this time was 31 MPa. Furthermore, the thermoplastic resin composition (2) alone was cut out and subjected to the tensile test. As a result, the average value of the tensile strength was 135 MPa.

The tensile strength of the bonded part was about 0.23 times as strong as the tensile strength of the thermoplastic resin (2).

The results of Examples 1 to 4 and Comparative Examples 1 and 2 are summarized in Table 1.

TABLE 1

| No | Example | | | | Comparative Example | |
|---|---|---|---|---|---|---|
| | 1 | 2 | 3 | 4 | 1 | 2 |
| Substrate | Woven cloth | Woven cloth | Woven cloth | Prepreg | Prepreg | Prepreg |
| Preheating | Not heated | Not heated | Not heated | Heated | Heated | Heated |
| Mold temperature at the time of placing material | 150° C. | 150° C. | 300° C. | 300° C. | 150° C. | 200° C. |
| Mold temperature at the time of injection | 255° C. | 255° C. | 300° C. | 300° C. | 150° C. | 200° C. |
| Relation between press pressure Pr and injection pressure Pi | Pr > Pi | Pr ≈ Pi | Pr > Pi | Pr > Pi | Pr > Pi | Pr > Pi |
| Relation between interface length L and thickness t | L = 3.1 t | L = 3.0 t | L = 2.8 t | L = 2.1 t | L = 1.2 t | L = 1.7 t |
| Tensile strength | 0.55 times | 1.0 time or more | 0.5 times | 0.36 times | 0.15 times | 0.23 times |

From the results shown in Table 1, it was found that the composite molded articles of the present embodiment are all excellent in bond strength.

The present application was based on Japanese Patent Application Nos. 2015-213407 and 2015-213408 filed on Oct. 29, 2015, the contents of which are incorporated herein by reference.

INDUSTRIAL APPLICABILITY

The composite molded article of the present invention is industrially applicable as a composite molded article comprising a continuous thermoplastic continuous fiber composite material and a thermoplastic resin composition to which high level mechanical properties are required, such as parts for various machines and automobiles including a pillar, a member, a flame, a beam, a support, an oil pan, a bumper and a seat frame, and housings for electrical components.

REFERENCE SIGNS LIST

1 Composite molded article
2 Compression molded part comprising a thermoplastic resin continuous fiber composite material
3 Injection molded part comprising a thermoplastic resin composition

The invention claimed is:

1. A composite molded article comprising:
a thermoplastic resin continuous fiber composite material comprising a continuous reinforcement fiber (A) and a thermoplastic resin (B); and
a thermoplastic resin composition,
wherein the thermoplastic resin continuous fiber composite material is bonded to the thermoplastic resin composition via a bonding surface,
wherein a bonded part between the thermoplastic resin continuous fiber composite material and the thermoplastic resin composition has a tensile strength which is 0.35 times or more as strong as a tensile strength of the thermoplastic resin composition,
wherein the bonded part between the thermoplastic resin continuous fiber composite material and the thermoplastic resin composition has a convexo-concave structure where the material and the composition are mixed with each other, and
wherein a length L of an interface at the bonding surface between the thermoplastic resin continuous fiber composite material and the thermoplastic resin composition; and a thickness t of the composite molded article satisfy a relation of L>1.8t.

2. The composite molded article according to claim 1, wherein the bonded part between the thermoplastic resin continuous fiber composite material and the thermoplastic resin composition has a tensile strength which is 0.5 times or more as strong as the tensile strength of the thermoplastic resin composition.

3. The composite molded article according to claim 1, wherein the bonded part between the thermoplastic resin continuous fiber composite material and the thermoplastic resin composition has a tensile strength which is 1.0 time or more as strong as the tensile strength of the thermoplastic resin composition.

4. The composite molded article according to claim 1, wherein the thermoplastic resin composition comprises a non-continuous reinforcement material.

5. The composite molded article according to claim 1, wherein the length L and the thickness t satisfy a relation of L>2.0t.

6. The composite molded article according to claim 1, wherein the interface is formed by the continuous reinforcement fiber (A) comprised in the thermoplastic resin continuous fiber composite material and the non-continuous reinforcement material comprised in the thermoplastic resin composition.

7. The composite molded article according to claim 1, wherein the continuous reinforcement fiber (A) is at least one selected from the group consisting of a glass fiber, a carbon fiber, an aramid fiber, a super strong polyethylene fiber, a polybenzazole fiber, a liquid crystal polyester fiber, a polyketone fiber, a metal fiber and a ceramic fiber.

8. The composite molded article according to claim 1, wherein the thermoplastic resin (B) is at least one selected from the group consisting of a polyolefin resin, a polyamide resin, a polyester resin, a polyether ketone, a polyether ether ketone, a polyether sulfone, a polyphenylene sulfide, a thermoplastic polyetherimide and a thermoplastic fluororesin.

9. The composite molded article according to claim 1, wherein the thermoplastic resin (B) is a thermoplastic resin fiber.

10. The composite molded article according to claim 1, wherein the thermoplastic resin continuous fiber composite material as a raw material is a fabric-shaped material.

11. A method for producing a composite molded article comprising a thermoplastic resin continuous fiber composite material comprising a continuous reinforcement fiber (A) and a thermoplastic resin (B), and a thermoplastic resin composition, wherein the thermoplastic resin continuous fiber composite material is bonded to the thermoplastic resin composition via a bonding surface, the method comprising:
   a step of shaping the thermoplastic resin continuous fiber composite material in a mold;
   a step of injecting the thermoplastic resin composition into the mold; and
   a step of bonding the thermoplastic resin continuous fiber composite material and the thermoplastic resin composition,
   wherein a bonded part between the thermoplastic resin continuous fiber composite material and the thermoplastic resin composition has a tensile strength which is 0.35 times or more as strong as a tensile strength of the thermoplastic resin composition,
   wherein the bonded part between the thermoplastic resin continuous fiber composite material and the thermoplastic resin composition has a convexo-concave structure where the material and the composition are mixed with each other, and
   wherein a length L of an interface at the bonding surface between the thermoplastic resin continuous fiber composite material and the thermoplastic resin composition; and a thickness t of the composite molded article satisfy a relation of L>1.8t.

12. The method for producing the composite molded article according to claim 11, wherein a bonded part between the thermoplastic resin continuous fiber composite material and the thermoplastic resin composition has a convexo-concave structure where the material and the composition are mixed with each other.

13. The method for producing the composite molded article according to claim 11, wherein an injection pressure or an injection-holding pressure applied when the thermoplastic resin composition is injected or held in the mold is equal to a press pressure applied when the thermoplastic resin continuous fiber composite material and the thermoplastic resin composition are compressed and molded.

14. The method for producing the composite molded article according to claim 11, wherein, after the thermoplastic resin composition is injected into the mold, the injection-holding pressure, which is equal to the press pressure applied when the thermoplastic resin continuous fiber composite material and the thermoplastic resin composition are compressed and molded, is continuously applied until the thermoplastic resin continuous fiber composite material and the thermoplastic resin composition has a temperature which is a solidification temperature −10° C., or less.

15. The method for producing the composite molded article according to claim 11, further comprising, after the step of injecting the thermoplastic resin composition into the mold, a step of compressing and molding the thermoplastic resin continuous fiber composite material and the thermoplastic resin composition in the mold having a temperature equal to or higher than the melting point of the thermoplastic resin (B).

16. The method for producing the composite molded article according to claim 15, wherein a temperature of the mold in the step of injecting the thermoplastic resin composition into the mold is equal to or lower than the melting point of the thermoplastic resin (B).

17. The method for producing the composite molded article according to claim 11, further comprising, after the step of shaping the thermoplastic resin continuous fiber composite material in the mold, a step of compressing and molding the thermoplastic resin continuous fiber composite material in the mold having a temperature equal to or higher than the melting point of the thermoplastic resin (B).

18. The method for producing the composite molded article according to claim 17, wherein, in the step of injecting the thermoplastic resin composition into the mold, the injection is carried out when a temperature of the mold is equal to or higher than the melting point of the thermoplastic resin (B).

* * * * *